2,800,495
XENYLTRICRESOXYSILANE

Loren A. Haluska, Midland, Mich., assignor to Dow Corning Corporation, Midland, Mich., a corporation of Michigan No Drawing. Application March 24, 1955,
Serial No. 496,613

6 Claims. (Cl. 260—448.2)

This invention relates to novel organosilanes and methods of preparing them. More particularly this invention relates to xenyltricresoxysilanes.

The primary object of this invention is to prepare a novel organosilane exhibiting good heat stability and suitable for use as a heat-transfer medium. Other objects and advantages obtained with the compositions of this invention are detailed in or will be apparent from the following specification and appended claims.

In accordance with this invention, novel heat-transfer fluid compositions comprising mixed isomers of xenyltricresoxy silane are prepared.

Xenyltricresoxysilane is a novel silicon compound of the formula

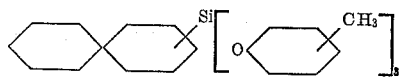

The silicon can be bonded to the xenyl radical in either the ortho, meta or para position but the meta and para isomers are the more readily prepared. Similarly, the cresoxy radicals can be attached through the oxygen-silicon bonding at the ortho, meta or para positions. Further, in any single molecule, the cresoxy radicals can all be a single isomeric type or they can be different isomers. It is to be clearly understood that pure isomers and mixtures of isomers are included within the scope of this invention.

The compounds of this invention are best prepared by the reaction of xenyltrichlorosilane with cresol. The xenyltrichlorosilane can be readily prepared by reacting biphenyl with silicochloroform or by use of a Grignard reagent coupling mechanism. Both of these methods are well known and extensively documented in the art. Similarly, cresol is old in the chemical art and means for producing it are well known.

The reaction of xenyltrichlorosilane and cresol can be carried forward by merely mixing the reactants and heating followed by distillation to obtain the desired xenyltricresoxysilane. The reaction involved is

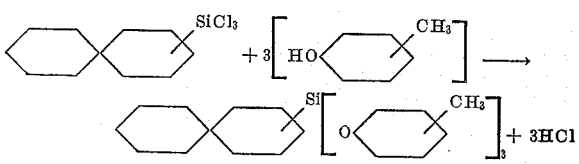

Alternatively, the compositions of this invention can be prepared by reacting any xenyltrialkoxysilane and cresol, the desired product and the corresponding alcohol being formed. Also, a metal salt of cresol can be reacted with xenyltrichlorosilane to obtain the desired product and the chloride of the metal, e. g. the sodium salt of cresol reacts with xenyltrichlorosilane to produce sodium chloride and xenyltricresoxysilane.

The xenyltricresoxysilane can be employed alone or can be admixed with other materials such as aryloxy- and/or tertiary-alkoxy silanes, and some xenylcresoxy-aryloxysilanes such as xenyldicresoxyphenoxysilane and xenylcresoxydiphenoxysilane, and/or xenylcresoxy tertiary-alkoxy silanes can be present, if lower melting point materials are required. These materials can be used either alone or in mixtures as heat transfer fluids in internal combustion engines, heated reaction areas, etc.

The following examples will aid those skilled in the art to understand and practice this invention, and are not intended to limit the scope of this invention which is properly delineated in the claims. All parts and percentages in the examples are based on weight unless otherwise specified.

Example 1

A three-necked flask was fitted with a stirrer, thermometer, dropping funnel and reflux condenser and was loaded with 691.2 parts of m-xenyltrichlorosilane. 1041 parts of cresol containing a mixture of approximately 70 percent of the meta isomer and 30 percent of the para isomer were added to the reaction zone via the dropping funnel over a period of 2 hours with the reaction mixture maintained at 10°–20° C. Thereafter, the reaction mixture was heated to 150°–185° C. for about 6 hours to insure complete reaction. The resulting mixture had a milky white appearance. 35 parts of calcium carbonate were added to neutralize the HCl produced by the reaction. The reaction mixture was then reheated to 50°–85° C. for 3 hours and filtered through a coarse sintered glass funnel. The filtrate was a clear light yellow fluid. The filtrate was then distilled at reduced pressure employing a vacuum cold trap. 213.4 parts of unreacted cresol were stripped off to 223° C. at a pressure of less than 3 mm. of mercury. 871.3 parts of mixed meta-xenyltricresoxy silanes distilled over in the range 243° to 257.5° C. at a pressure of 1 mm. of mercury and less. 30.4 parts of cresol were recovered from the cold trap and 190.1 parts of residue remained. The meta-xenyltricresoxysilanes were obtained in a yield of 71.7 percent of theory and had a viscosity at 25° C. of 870 cs., a freezing point of −8° C., and a refractive index at 25° C. of 1.6010.

The m-xenyltricresoxysilane was heated in an open vessel in contact with air and moisture to 200° C. for 16 hours and its viscosity at 25° C. increased only to 1135 cs., whereas tetracresoxysilane partially gels and its viscosity cannot be measured when so heated. The m-xenyltricresoxysilane gelled after 72 hours at 250° C., whereas tetracresoxysilane gels in less than 24 hours at this temperature. Thus, the xenyltricresoxysilane of this invention is significantly more heat stable than tetracresoxysilane.

Example 2

Employing the equipment and procedure of Example 1, p-xenyltricresoxysilane was prepared from 568 parts of p-xenyltrichlorosilane and 833 parts of the cresol of Example 1. The HCl reaction by-product was neutralized with 100 parts of calcium carbonate and the reaction mixture was filtered and distilled as in Example 1. 307.9 parts of unreacted cresol were stripped off to 224° C. at less than 3 mm. of mercury. 604.4 parts (61 percent of theory) of mixed isomers of p-xenyltricresoxysilane were recovered and found to have the following physical properties: Viscosity at 25° C. is 665 cs., freezing point is 0° C., refractive index at 25° C. is 1.6034, specific gravity is 1.143, viscosity at 25° C. after heating at 200° C. for 16 hours is 935 cs., and gel time at 250° C. is 234 hours. The heat stability of this reaction product is greatly superior to that of tetracresoxysilane which gels in less than 24 hours at 250° C. and is gelled to the point where viscosity cannot be measured after heating at 200° C. for only 16 hours in an open vessel and in contact with air and moisture.

That which is claimed is:
1. Xenyltricresoxy silane.
2. 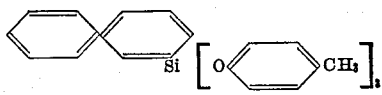
3. 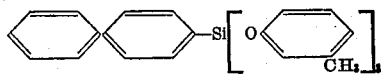
4. 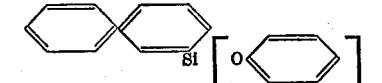
5. 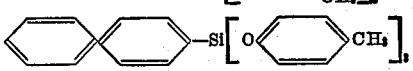
6. A fluid heat-transfer composition consisting essentially of xenyltricresoxy silane.
References Cited in the file of this patent
UNITED STATES PATENTS
| | | |
|---|---|---|
| 2,511,820 | Barry et al. | June 13, 1950 |
| 2,674,579 | Morgan et al. | Apr. 6, 1954 |